United States Patent
Dehlsen et al.

(10) Patent No.: US 6,955,025 B2
(45) Date of Patent: Oct. 18, 2005

(54) SELF-ERECTING TOWER AND METHOD FOR RAISING THE TOWER

(75) Inventors: James G. P. Dehlsen, Montecito, CA (US); Amir S. Mikhail, Santa Barbara, CA (US)

(73) Assignee: Clipper Windpower Technology, Inc., Carpenteria, CA (US)

( * ) Notice: Subject to any disclaimer, the term of this patent is extended or adjusted under 35 U.S.C. 154(b) by 10 days.

(21) Appl. No.: 10/644,419

(22) Filed: Aug. 19, 2003

(65) Prior Publication Data

US 2004/0045226 A1 Mar. 11, 2004

Related U.S. Application Data

(60) Provisional application No. 60/409,904, filed on Sep. 11, 2002.

(51) Int. Cl.[7] ............................................... E04H 12/34
(52) U.S. Cl. .............................. 52/745.17; 52/745.18; 52/726.3; 52/726.4; 52/651.01; 52/123.1; 52/116
(58) Field of Search ............................. 52/40, 745.17, 52/745.18, 745.04, 726.3, 726.4, 651.01, 651.02, 651.05, 651.06, 116, 117, 123.1; 416/DIG. 6

(56) References Cited

U.S. PATENT DOCUMENTS

| | | | | |
|---|---|---|---|---|
| 1,634,595 A | * | 7/1927 | Price .......................... | 52/223.4 |
| 3,009,546 A | * | 11/1961 | Anderson, Sr. et al. ....... | 52/108 |
| 3,194,411 A | * | 7/1965 | Durand ....................... | 212/295 |
| 3,461,989 A | * | 8/1969 | Wacht et al. ................. | 182/19 |
| 3,554,319 A | * | 1/1971 | Smith et al. .................. | 182/46 |
| 3,604,533 A | * | 9/1971 | Eckels et al. ................. | 182/46 |
| 4,019,604 A | * | 4/1977 | Benson ........................ | 182/2.7 |
| 4,081,055 A | * | 3/1978 | Johnson ....................... | 182/2.8 |
| 4,185,427 A | * | 1/1980 | Raymond .................... | 52/115 |
| 4,643,273 A | * | 2/1987 | Stokoe ........................ | 182/2.9 |
| 4,775,029 A | * | 10/1988 | MacDonald et al. ......... | 182/2.1 |
| 5,216,867 A | * | 6/1993 | Wasterval et al. .......... | 52/745.17 |
| 5,944,204 A | * | 8/1999 | Vollmer ....................... | 212/261 |
| 6,408,575 B1 | * | 6/2002 | Yoshida et al. ................ | 52/40 |

FOREIGN PATENT DOCUMENTS

| | | | | |
|---|---|---|---|---|
| DE | 2806081 | | 8/1979 | |
| DE | 19931713 | | 1/2001 | |
| EP | 001213253 A1 | * | 6/2002 | ........... B66C/23/34 |
| NL | 9301539 | | 4/1995 | |

\* cited by examiner

*Primary Examiner*—Robert Canfield
(74) *Attorney, Agent, or Firm*—Owen L. Lamb

(57) ABSTRACT

A tall tower is divided into an upper section with a tower top and a lower section with a tower bottom. The sections are hinged together. The lower section is hinged to a tower base. A telescoping crane is attached to a lift point on the lower section. The crane is extended to lift the sections to the vertical position with the lower section resting on the base and the tower top of the upper section near ground level. A heavy load is attached to the tower top end using a small ground crane while the tower top of the upper section is near ground level. The telescoping crane is attached to another lift point on the upper section to partially lift the upper section, which is supported in this position. The telescoping crane is relocated and reattached to the lift point on the upper section. The telescoping crane is fully extended to raise the upper section and load to vertical above the lower section.

15 Claims, 5 Drawing Sheets

FIGURE 1 A (PRIOR ART)
FIGURE 1 B (PRIOR ART)
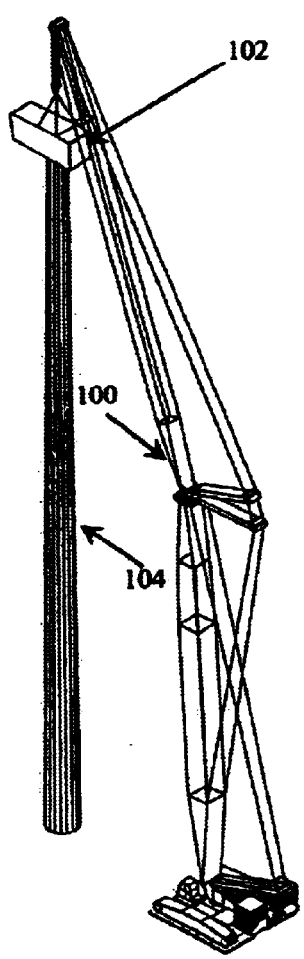
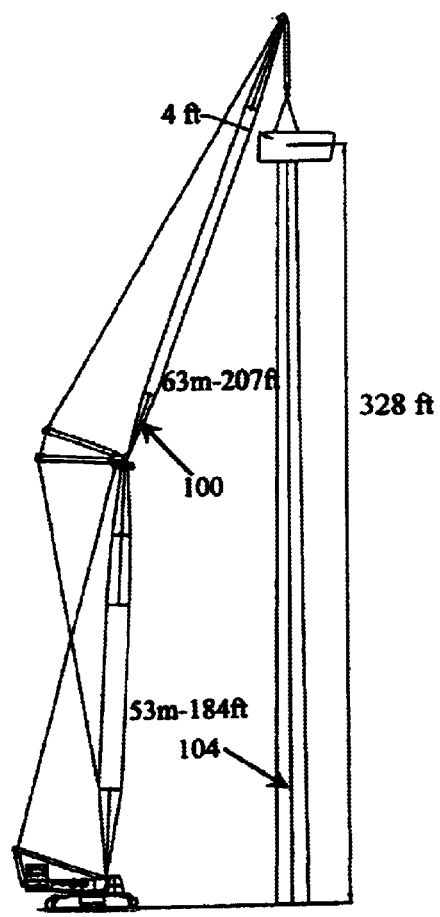

SELF-ERECTING TOWER AND METHOD FOR RAISING THE TOWER

REFERENCE TO RELATED APPLICATIONS

This application claims benefit of the provisional application Ser. No. 60/409,904 filed Sep. 11, 2002.

BACKGROUND OF THE INVENTION

1. Field of the Invention

This invention relates to self-erecting towers, to a method for raising the tower, and more particularly to a method and means for lifting heavy loads atop high towers (60–100 m) on land and offshore, such as nacelles and rotors for wind turbine generators, electric transformers on top of power poles and other tall tower applications.

2. Description of the Prior Art

Recently, the cost of wind-generated electricity has been dropping due to technological innovations and economies of scale. The average turbine size is now approximately 1.5 MW with rotor diameters ranging from 70 to 85 m. This class of turbines has on average a nacelle weight of 50 tons and a rotor weight of approximately 35 tons. To improve the economics of wind turbines, manufacturers have been designing taller towers to take advantage of greater wind energy at higher levels above ground. Manufacturers are increasingly relying on 80 and 100 m tower designs, rather than the average 60–70 m towers used previously. The cost of lifting these weights to the top of tall land based or offshore towers can be prohibitive, mainly due to the reach of conventional cranes, which require much higher crane capacity than the actual weight being lifted. This is due to the bending moment resulting from the reach of the conventional cranes.

U.S. Pat. No. 6,408,575 granted on Jun. 25, 2002 describes a self-erecting tower method utilizing a hinged gin pole construction. The heavy weights of the tower and nacelle will require massive winching and gin pole structure to lift the whole tower with the nacelle and rotor.

Another approach is described in patent U.S. Pat. No. 6,278,198 issued on Aug. 21, 2001. This approach describes a moveable carriage that slides on guide rails on the two sides of the tower. The carriage is used to lift sections of the tower and the nacelles and rotor. This method requires a constant diameter tower section, which requires added support at the base to carry higher bending loads at the bottom tower section. Other methods are detailed in U.S. Pat. No. 5,181,693 issued on Jan. 26, 1993, that utilize a hydraulic cylinder to lift nesting tower sections. U.S. Pat. No. 4,272,929 issued on Jun. 16, 1981, utilizes pulley system for lifting. U.S. Pat. No. 4,266,911 issued May. 12, 1981 utilizes a cable system for lifting.

It is desirable to provide an improved method of raising a tall land based or offshore tower such as a wind turbine tower.

It is desirable to be able to lift weights onto the top of a tall tower with crane capacity comparable to the weight lifted.

It is desirable to provide a method of raising a wind turbine tower and positioning a wind turbine on the upper end of the wind turbine tower without employing a large crane.

It is also desirable to provide an improved method and means of raising a wind turbine tower that is less dangerous and can be performed in higher winds than the prior art methods.

SUMMARY OF THE INVENTION

Briefly, the invention is concerned with a method of lifting a heavy apparatus onto the top of a very tall tower (80–100 m) with a crane capacity comparable to the weight of the apparatus lifted. A tall tower is divided into an upper section and lower section. The lower section is hinged to a tower base secured to the ground. The upper and lower tower sections are hinged at a tower mid-point and separated by a separator bar. A telescoping crane is attached to a lower section lift point on the lower section near the hinged end that connects the two sections. The crane is attached to the tower base by a restraining cable. The crane is extended to lift the two sections to the vertical position with the lower section resting on the tower base and the top of the upper section near ground level. The lifting may be performed by either telescoping the crane or by positioning the crane in a full, extended position and lifting by withdrawing the crane cable. A drivetrain is installed on the tower top using a small ground crane. The telescoping crane is attached to an upper section lift point on the upper section near the top of the tower. The telescoping crane is partially extended to allow installation of a temporary tower stand to support the upper section in a partially erected position. The temporary tower stand is necessary to support the partially erected tower while the telescoping crane is removed for relocation. The telescoping crane is relocated to the other side of the tower and reattached to the upper section lift point. The crane is attached to the base by a restraining cable. Finally the telescoping crane is fully extended to raise the upper section with the attached drivetrain to a vertical position over the lower section.

Once raised, each section is secured in place by a securing mechanism, such as latches or bolts. This can be done automatically, eliminating the need for workers to climb the tower. The hinges at the base and mid tower may be removed.

Since the method of the invention employs a telescoping hydraulic crane that pushes hinged sections of the tower into position, it therefore minimizes the crane reach and the corresponding high bending moments exerted on the crane base.

The invention has the advantage that the method of delivery of heavy weights on tall towers requires crane sizes that are comparable to the weights lifted as opposed to the conventional methods that require crane capacities that are 5 to 8 times higher than the lifted weights. The invention has the advantage of being barge mountable for offshore installation.

The invention has the advantage that the improved method and means of raising a wind turbine tower is less dangerous than the prior art methods since ground crews attach the drivetrain onto the tower top at or near ground level.

Another advantage of the invention is more controlled handling of the tower and nacelle, allowing for erection in higher wind speeds.

BRIEF DESCRIPTION OF THE DRAWINGS

The invention will be described in detail with reference to the drawings in which:

FIGS. 1A and 1B are a perspective view and a front elevation of a prior art crane for lifting drivetrains and rotors onto a tower; and, FIGS. 2A through 2H show schematically a tall tower and method of raising the tower in accordance with the present invention.

DESCRIPTION OF THE PREFERRED EMBODIMENTS

Figure 2:
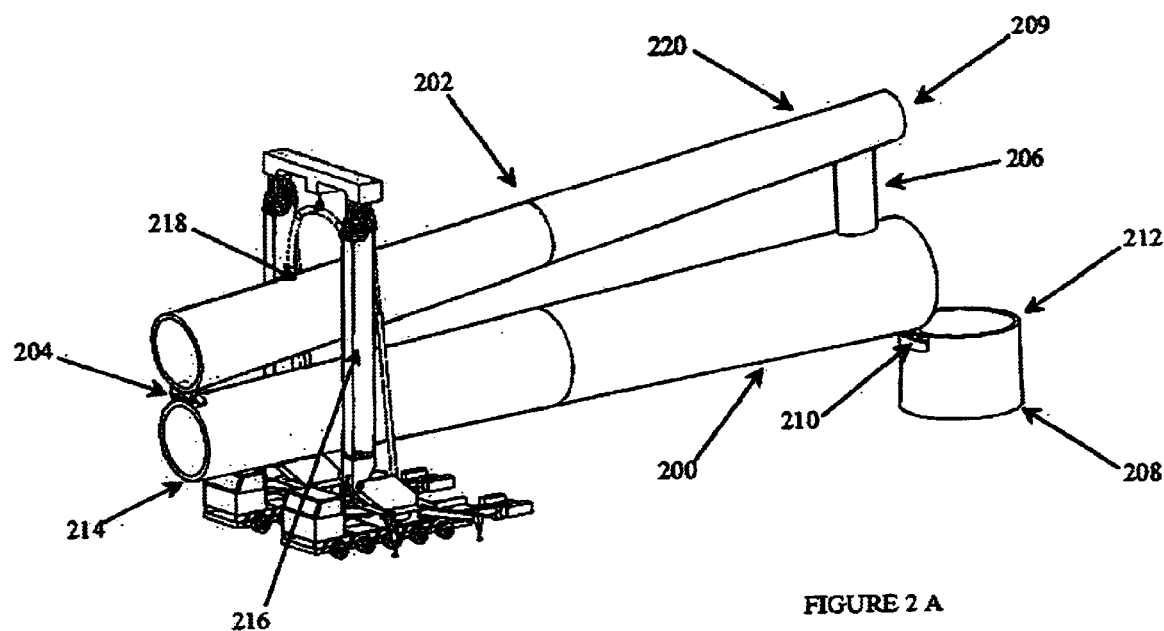
Figure 2:
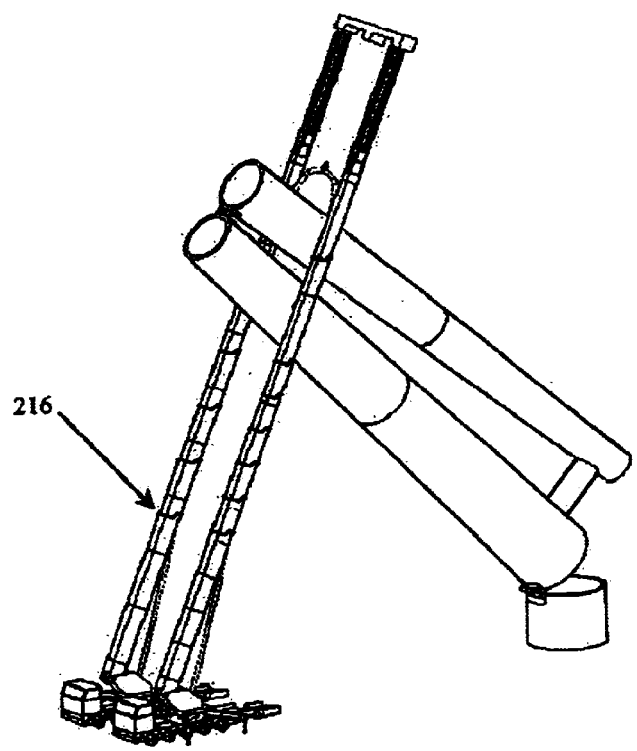
Figure 2:
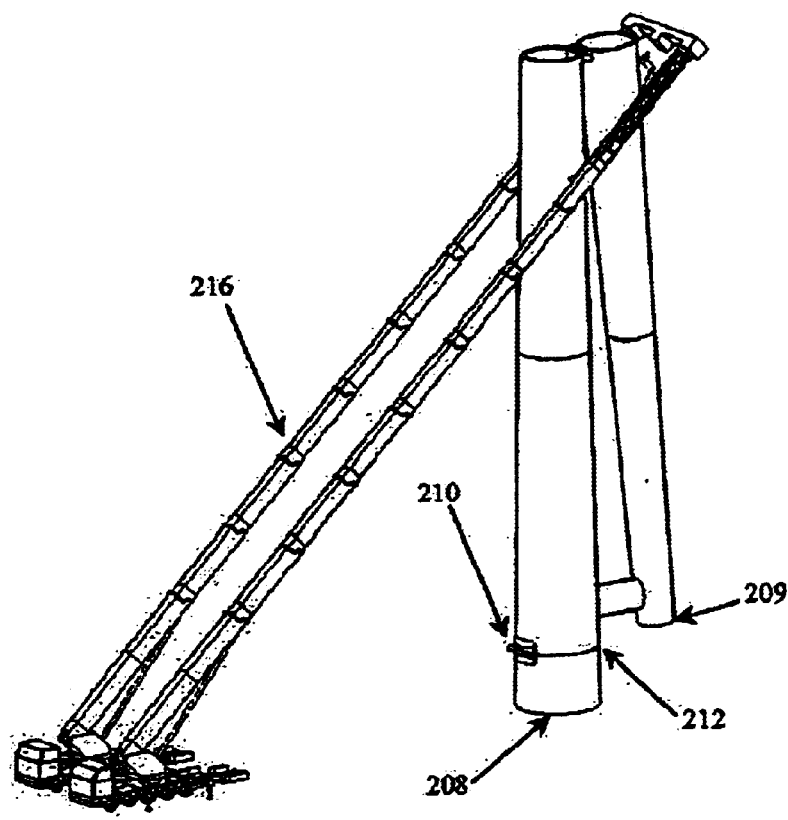
Figure 2:
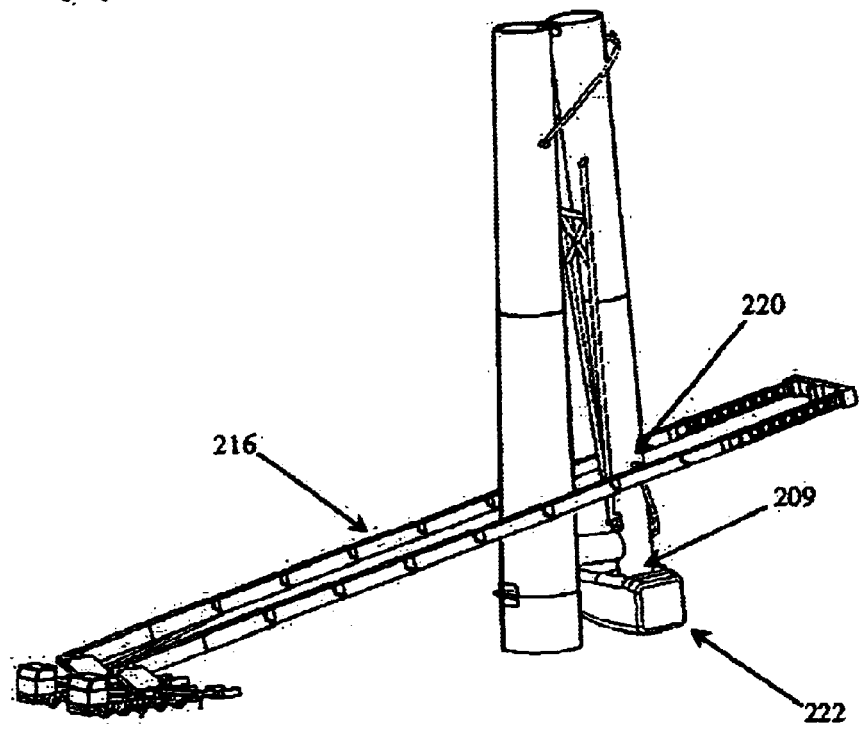
Figure 2:
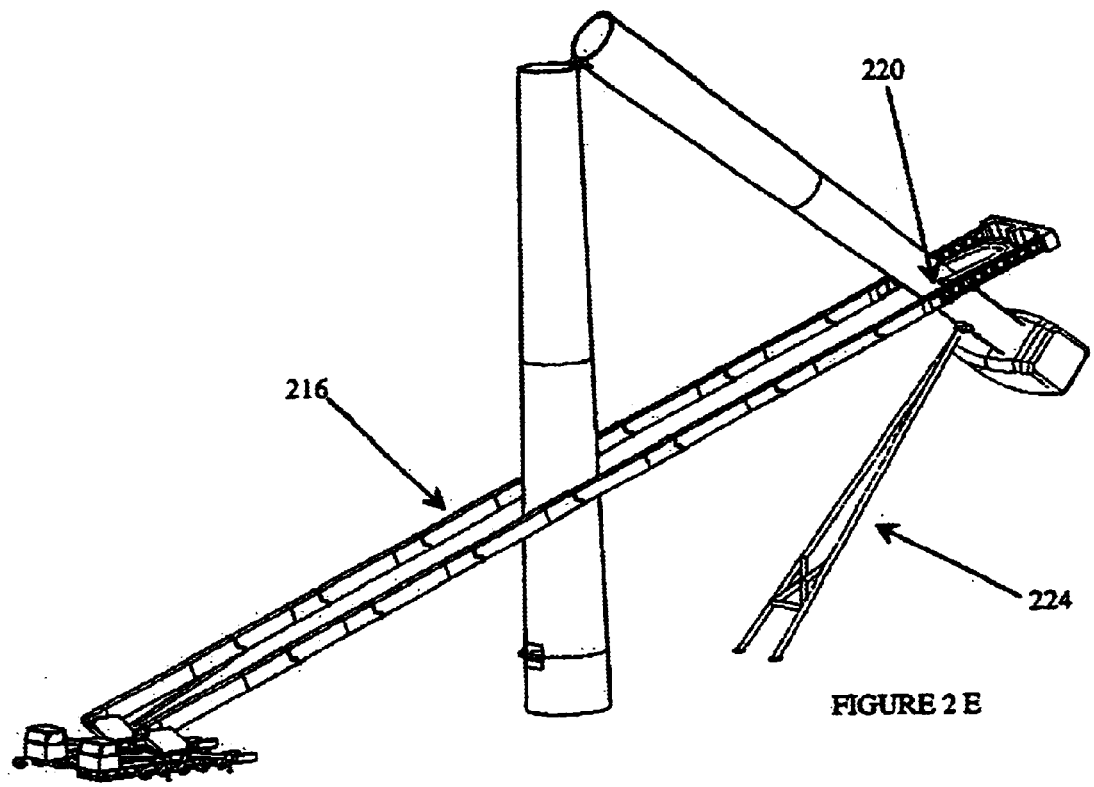
Figure 2:
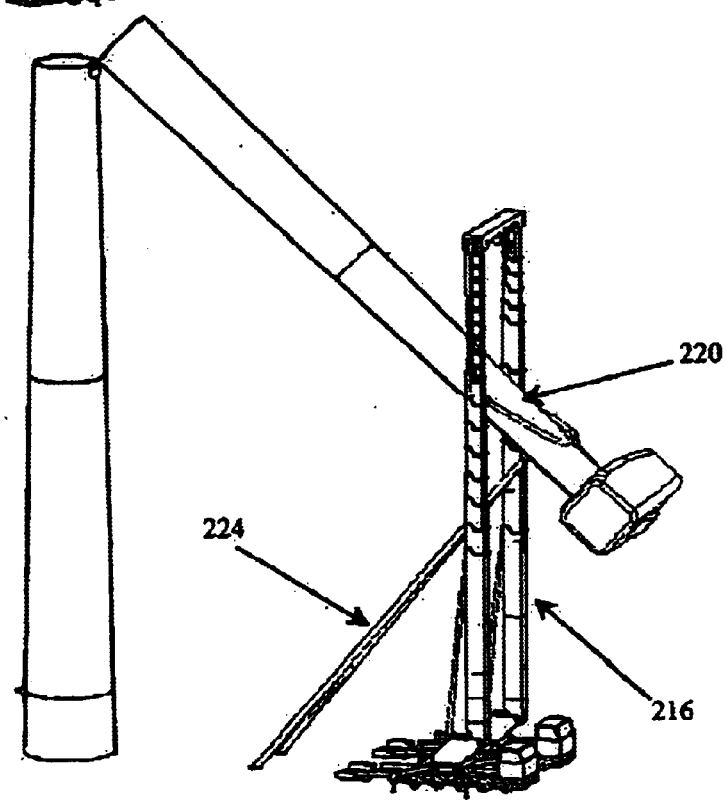
Figure 2:
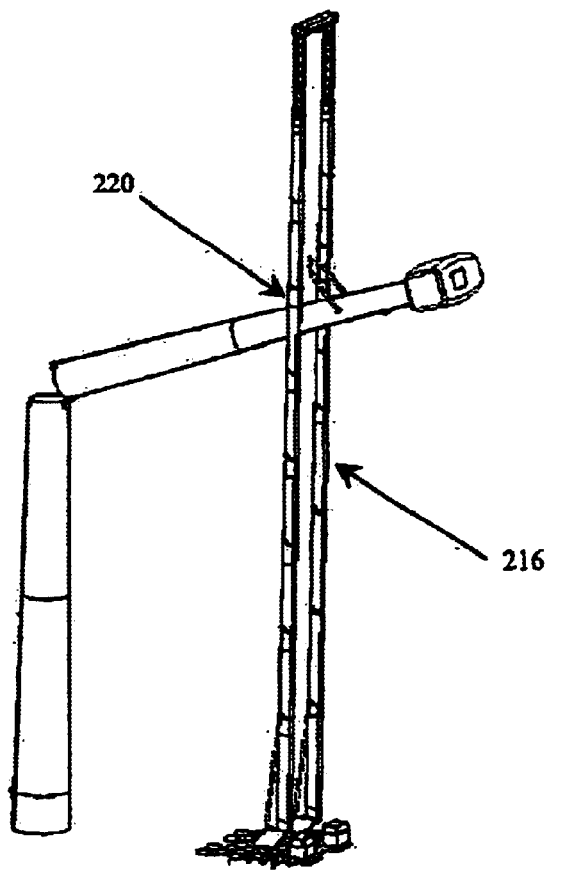
Figure 2:
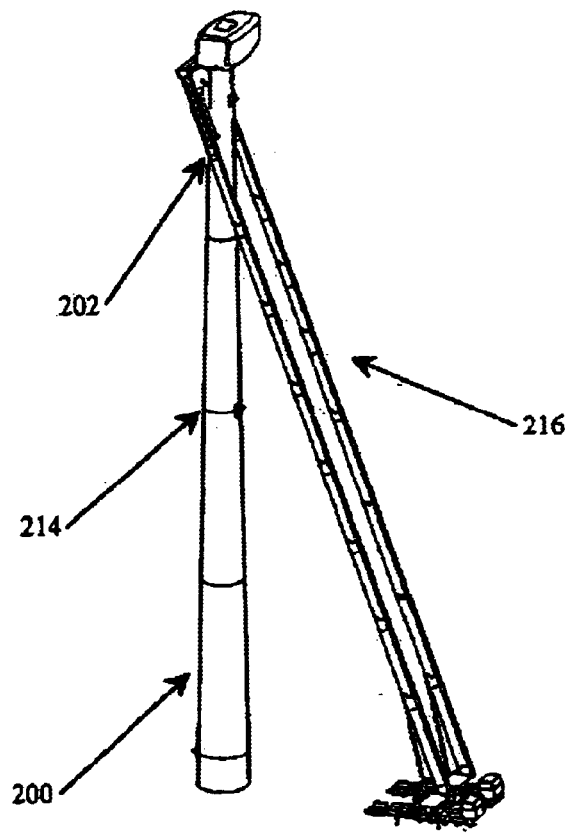

Refer to FIGS. 1A and 1B, which show the traditional method, using a typical crane 100, of lifting a drivetrain and rotor 102 onto a tall tower 104. A 50-ton drivetrain lift would require a 400–600 ton crane of the style shown in FIGS. 1A and 1B. This higher capacity is required due to the high bending moment associated with the crane reach.

FIGS. 2A through 2H show schematically a tall tower and method of raising the tower in accordance with the present invention. Two tower sections 200, 202 are hinged at 204 and separated by a separator bar 206. The lower section is attached to a tower base 208 by a lower-section hinge 210. A lower-section latch 212 and upper-section latch 214 will be described subsequently. A telescoping crane 216 is attached to the lower section lift point 218, which is located on the lower section between a mid-point of said lower section and the hinged end 204 that hinges the two sections together. It should be understood that since the lower and upper sections are held together by the separator bar 206, lower section lift point 218 could actually be located on the upper section near the hinge 204 if desired with the same result of lifting the two sections together. Therefore references to "lift point" in the specification and claims are not meant to limit the actual location of a lift point to a particular section. An upper-section lift point 220, which will be described in more detail subsequently, is located on the upper section between a mid-point of the upper section and the tower top (top end) 209.

The telescoping crane 216 is activated (by extending the crane or by use of a cable described below) to lift the two tower sections 200, 202 to the vertical position FIGS. 2B, 2C. The two tower sections 200, 202 are supported by the concrete tower base 208. The lower section latch 212 is closed to secure the lower section to the base 208. A drivetrain 222 is installed on the tower top 209 (which is now near ground level), via a small ground crane (not shown) and a crew working at ground level, FIG. 2D. The crane 216 is attached to the upper lift point 220 and activated to partially raise the upper section to allow the ground crew to install a temporary tower stand 224, FIGS. 2E, 2F. The temporary tower stand 224 supports the partially erected tower to allow the removal of the telescoping crane 216. The telescoping crane 216 is relocated to the other side of the tower and reattached to the upper lift point 220, FIG. 2F. The stand 224 is removed and the crane is activated as shown in FIG. 2G until the upper section is The reverse procedure is employed to lower the drivetrain 222 for servicing at ground level.

The system may use a single crane or dual hydraulic cranes. If dual cranes are employed as shown in FIG. 2, the cranes are positioned on opposite sides of the tower sections 200, 202. The top of each crane has a folding arm, which locks the top of one crane to the top of the other crane. The folding arm carries a pulley centered between the crane tops.

The cranes are extended and locked at their extended position. A cable attaches to a sling on the tower's lifting point (218, or 220) and is drawn through the pulley at the top of the cranes. The cable is driven by activating a winch at the base of the crane which accomplishes the lifting.

The crane position in lifting is always in the direction of the center of gravity relative to the hinged center of rotation. This precludes any bending moments in the base of the crane. The cranes should always be secured to the tower base 208 with a restraining cable (not shown on drawings).

SUMMARY OF THE METHOD OF ERECTING A TALL TOWER

The method of erecting a tall tower comprises the steps of:

(1) Dividing the tall tower into an upper section 200 and lower section 202

(2) Hinging the lower section to a tower base 208 secured to the ground.

(3) Hinging the upper and lower tower sections at a mid-point 204, with the upper section folded back onto the lower section.

(4) Separating the ends of the sections opposite the mid-point with a separator bar 206.

(5) Locating a telescoping crane 216 on a side of the base at a lower-section lift point 218 on the lower section near the hinged end midpoint 204.

(6) Attaching the telescoping crane 216 to the lower-section lift point 218 on the lower section near the hinged end.

(7) Activating the telescoping crane to thereby lift the two sections to the vertical position with the lower section resting on the base and the top end 209 of the upper section near ground level.

(8) Securing the lower section to the base 208 with bolts or a latch.

(9) Installing a drivetrain 110 onto the tower top end 209 using a small ground crane.

(10) Attaching the telescoping crane to an upper-section lift point 220 on the upper section near the top end 209 opposite the hinged end 204.

(11) Partially extending the telescoping crane to allow installation of a temporary tower stand 224.

(12) Installing the temporary tower stand 224 thereby supporting the upper section 202 of the partially erected tower to allow the removal of the telescoping crane.

(13) Relocating the telescoping crane to the other side of the tower base.

(14) Reattaching the telescoping crane to the upper-section lift point 220.

(15) Activating the telescoping crane to thereby fully raise the upper section with the attached drivetrain to vertical.

(16) Securing the upper section to the lower section with bolts or a latch.

For the case discussed above the crane size required to lift a 50-ton load would only be 73 tons, a major cost saving in lifting and erection cost.

The invention has been described with reference to drawings in which two sections of tower are shown, a lower section 200 and an upper section 202. Those skilled in the art will realize that one or more intermediate sections may be provided, if desired, between the upper and lower sections, all sections being hinged together and provided with appropriate lift points, hinges and latches. In this case each intermediate section has an intermediate section lift point located such that an extendable crane can engage the intermediate section lift point and lift the intermediate section to a vertical position subsequent to the next lower section being raised to a vertical position. Any additional sections are hinged together and placed one under another along with the upper and lower sections prior to being lifted in place vertically.

This invention has been described with reference to lifting heavy loads above ground atop high towers, such as nacelles and rotors for wind turbine generators, electric transformers on top of power poles and other tall tower applications. Those skilled in the art will realize that the invention can be adapted to ocean situations wherein the base of the tower does not rest on ground but rests on the ocean floor, on a tethered structure under water, on an ocean platform or on the deck of a ship.

Those skilled in the art will realize that the invention can be adapted to outer space in weightless situations wherein the base of the tower does not rest on ground but rests on a space craft, on a space station or is tethered in space.

While the invention has been particularly shown and described with reference to preferred embodiments thereof, it will be understood by those skilled in the art that the foregoing and other changes in form and detail may be made therein without departing from the scope of the invention.

What is claimed is:

1. A method of erecting a tall tower comprising steps of:
   A. dividing said tall tower into a number of sections including an upper section with a tower top and a lower section with a tower bottom, said tower sections being hinged together with one of said sections being initially placed under another of said sections in a non-vertical position;
   B. hinging said lower section to a tower base;
   C. raising said lower section to a vertical position such that said tower bottom rests on said tower base; and,
   D. raising said upper section to a vertical position above said lower section subsequent to said step C of raising said lower section to a vertical position.

2. The method of claim 1 wherein said sections are secured in said vertical position.

3. The method of erecting a tall tower of claim 2 wherein
   said step C raising said lower section is performed by pushing on said lower section with a telescoping crane; and,
   said step D raising said upper section is performed by pushing on said upper section with a telescoping crane.

4. The method of claim 1 wherein prior to step D a load is installed on said tower top.

5. The method of claim 4 wherein said sections are secured in said vertical position.

6. The method of erecting a tall tower of claim 4 wherein
   said step C raising said lower section is performed by pushing on said lower section with a telescoping crane; and,
   said step D raising said upper section is performed by pushing on said upper section with a telescoping crane.

7. The method of erecting a tall tower of claim 1 wherein
   said step C raising said lower section is performed by pushing on said lower section with a telescoping crane; and,
   said step D raising said upper section is performed by pushing on said upper section with a telescoping crane.

8. A method of erecting a tall tower comprising steps of:
   A. dividing said tall tower into a number of sections including an upper section with a tower top and a lower section with a tower bottom, said tower sections being hinged together;
   B. hinging said lower section to a tower base;
   C. attaching a crane to a lift point on said lower section;
   D. activating said crane to lift said sections to a vertical position with said lower section resting on said tower base and said tower top of said upper section near said tower base;
   E. attaching a crane to a lift point on one of said sections;
   F. partially activating said crane;
   G. installing a temporary tower stand, which supports the partially erected tower to allow the removal of said crane;
   H. attaching said crane to a lift point on said upper section; and,
   I. activating said crane to raise said upper section to a vertical position above said lower section.

9. The method of claim 8, wherein subsequent to step B one of said sections is placed under another of said sections.

10. The method of claim 8, wherein subsequent to step D a load is installed on said tower top.

11. The method of claim 8, wherein:
    said number of sections includes an intermediate section;
    prior to step B said sections are placed one under another; and,
    said step C includes raising said intermediate section to a vertical position subsequent to raising said lower section to a vertical position.

12. The method of erecting a tall tower of claim 8, wherein said crane is a telescoping crane, said method further comprising:
    attaching said telescoping crane to said lift point on said lower section;
    extending said telescoping crane to lift said sections to a vertical position with the lower section resting on said tower base and said tower top of said upper section near said tower base;
    attaching a load to said tower top while said tower top of the upper section is near said tower base;
    attaching said telescoping crane to another lift point on said upper section to partially lift said upper section to a position short of vertical;
    supporting said upper section in said position short of vertical;
    relocating said telescoping crane and re-attaching said telescoping crane to said lift point on said upper section; and, fully extending said telescoping crane to raise said upper section and load to vertical above said lower section.

13. The method of erecting a tall tower of claim 8, wherein said crane is a telescoping crane.

14. A method of erecting a tall tower comprising steps of:
    A. dividing said tall tower into a number of sections including an upper section and a lower section;
    B. hinging said lower section to a tower base;
    C. hinging said upper and lower tower sections to each other, with said upper section folded back onto said lower section;
    D. attaching a crane to a lift point on one of said sections;
    E. activating said crane to thereby lift said upper and lower sections to a vertical position with said lower section resting on said base and a top end of said upper section near said base;
    F. installing a load onto said tower top end;
    G. attaching said crane to an upper-section lift point on said upper section;
    H. activating said crane to partially raise said upper section;
    I. installing a temporary tower stand to support said upper section of said partially erected tower to allow removal of said crane;
    J. relocating said crane to another side of said tower base;
    K. reattaching said crane to said second lift point; and,
    L. activating said crane to thereby raise said upper section with said attached load to a vertical position above said lower section.

15. The method of erecting a tall tower of claim 14, wherein said crane is a telescoping crane.

* * * * *